United States Patent [19]

Nakamori

[11] 3,807,873

[45] Apr. 30, 1974

[54] METHOD FOR DETECTING TEMPER COLOR APPEARING ON A METAL STRIP

[75] Inventor: Masahiko Nakamori, Kure, Japan

[73] Assignees: Hitachi Electronics Co. Ltd.; Nisshin Steel Co. Ltd., both of Tokyo, Japan

[22] Filed: Oct. 26, 1972

[21] Appl. No.: 300,888

[30] Foreign Application Priority Data
Nov. 5, 1971   Japan............................. 46-87687

[52] U.S. Cl.................. 356/188, 356/51, 356/189, 356/199, 356/212
[51] Int. Cl.......................... G01j 3/48, G01n 21/34
[58] Field of Search ........... 356/178, 186, 188, 189, 356/195, 212, 199, 51, 45

[56] References Cited
UNITED STATES PATENTS
3,325,649  6/1967  Bird ....................................... 356/51
3,439,175  4/1969  Kammuller et al. ................... 356/51
3,089,382  5/1963  Hecht et al. ......................... 356/188

Primary Examiner—Ronald L. Wibert
Assistant Examiner—V. P. McGraw
Attorney, Agent, or Firm—Craig and Antonelli

[57] ABSTRACT

A method for automatically, continuously and quantitatively detecting a temper color appearing on a stationary or moving metal strip, in which a beam of light including a suitable component having a wavelength shorter than 540m$\mu$ (5,400A) and another suitable component having a wavelength longer than 540m$\mu$ is directed at a suitable angle to the metal strip, and after converting the intensity of the reflected light components into electrical signals and separating these electrical signals from each other, the ratio between these two electical signals is calculated so as to determine the relative depth of the temper color on the basis of the relative variation of the intensity ratio.

2 Claims, 3 Drawing Figures

FIG. I
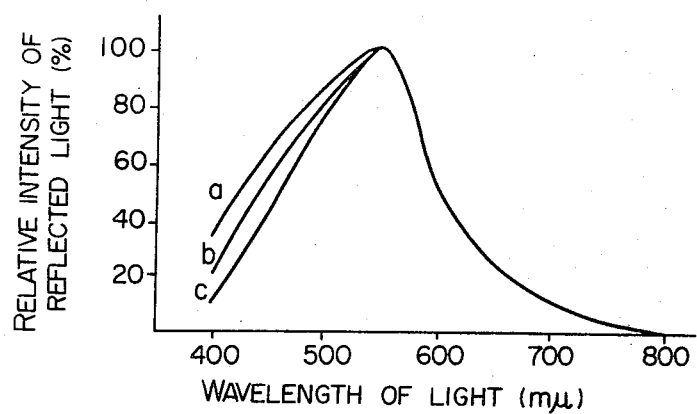
FIG. 3
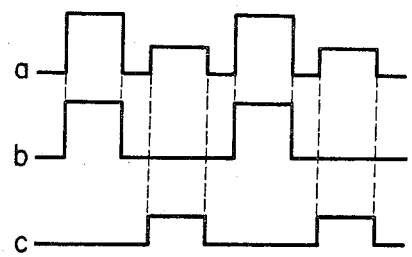

METHOD FOR DETECTING TEMPER COLOR APPEARING ON A METAL STRIP

BACKGROUND OF THE INVENTION

1. Field of the Invention

This invention relates to a method for automatically, continuously and quantitatively detecting the temper color appearing on metal strips.

2. Description of the Prior Art

In an annealing step during the manufacture of strips of metal such as stainless steel, the annealed steel strip shows normally a colorless metallic luster. However, a light yellow color, normally called a temper color, appears frequently on the surface of the steel strip depending on the annealing conditions thereby deteriorating the surface quality to an extent that the steel strip is no longer commercially acceptable. Heretofore, the detection of such a temper color has been determined solely by visual inspection due to the fact that suitable detecting means were not available. However, in many cases the temper color cannot be accurately detected due to factors including the difference in the personal detecting ability of individual inspectors and the fatigue of his eye. Especially, due to the fact that this temper color tends to arise from an entirely color-free state and in many cases, comes gradually into an appreciable coloring, the naked eye of the human body is adapted easily to such gradual coloring and tends to overlook it until considerable coloring has taken place on the surface of a strip. Therefore, the prior art technique of detecting the temper color with the naked eye has been found unsatisfactory in its delays in checking the appearance of the temper color which gives rise not only to the rejection of finished strips but to the failure in detecting lightly colored steel strips. This technique has, thus, not been sufficient for quantitatively examining the extent of coloring

SUMMARY OF THE INVENTION

It is therefore an object of the present invention to obviate the drawbacks of the prior art method relying on visual inspection and to provide a method in which optical and electrical means are employed for automatically, continuously and quantitatively detecting the occurence of the temper color.

Another object of the present invention is to provide a method which enables effective production and quality control in response to the detected temper color for avoiding undesirable rejection of the products thereby improving the inspection efficiency and increasing the production rate.

The present invention utilizes the fact that, when light having wavelengths shorter than $540m\mu$ (5,400A) is directed to a metal strip bearing a temper color, it is absorbed in larger quantities than when directed to a normal colorless metal strip.

The present invention which attains the above objects provides a method for detecting a temper color appearing on a stationary or moving metal strip, in which a beam of light including a suitable component having a wavelength shorter than $540m\mu$ (5,400A) and another suitable component having a wavelength longer than $540m\mu$ is directed at a suitable angle to the metal strip, and after converting the intensity of the reflected light components into electrical signals and separating these electrical signals from each other, the ratio between these two electrical signals is calculated so as to determine the relative extent of the temper color on the basis of the relative variation of the intensity ratio.

The term "light component" used herein is to denote such a component showing a line spectrum including one or a plurality of spectral lines, a band spectrum, or a continuous spectrum over a certain wavelength range.

BRIEF DESCRIPTION OF THE DRAWING

FIG. 1 is a graph showing the relation between the wavelength of light and the relative intensity of reflected light for illustrating the basic principle of the present invention.

FIG. 3 shows waveforms of electrical signals appearing at various portions of the apparatus shown in FIG. 2.

DESCRIPTION OF THE PREFERRED EMBODIMENT

Figure 2:
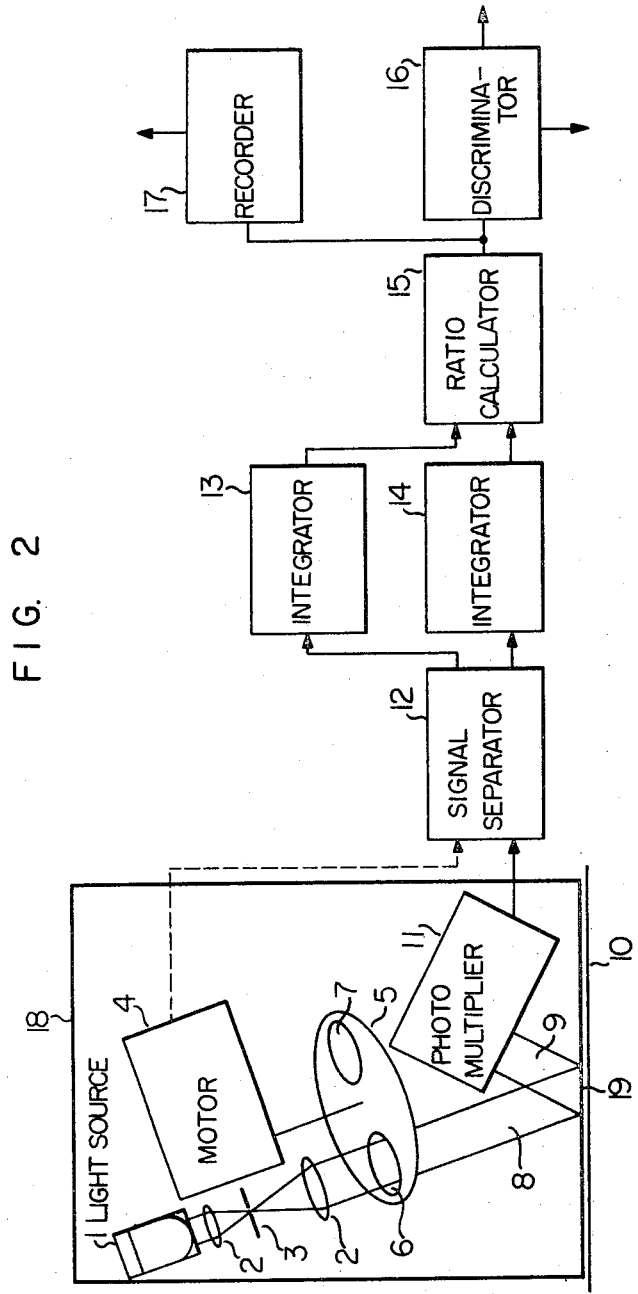
FIG. 2 is a diagrammatic view showing the arrangement of optical and electrical means in an apparatus used for carrying out the method according to the present invention.

FIG. 1 shows the relation between the wavelength of light and the intensity of reflected light when a beam of visible light is directed to a metal strip such as a stainless steel strip bearing a temper color slightly, to a stainless steel strip bearing a temper color considerably, and to a normal color-free stainless steel strip, and the light beams reflected from these strips are analyzed to compare them with one another. The Curves $a$, $b$ and $c$ in FIG. 1 represent the results of analysis on a normal color-free stainless steel strip, a stainless steel strip bearing a slight occurence of temper color, and a stainless steel strip bearing a considerable amount of temper color, respectively. It will be seen from FIG. 1 that the stainless steel strips bearing the temper color absorb light having wavelengths shorter than yellow (540 to $580m\mu$) in greater quantities than the normal color-free stainless steel strip and do not absorb light having wavelengths longer than yellow as in the normal color-free stainless steel strip. The above fact applies substantially to other alloy steel strips. The graph shown in FIG. 1 teaches the fact that, if a metal strip bears the temper color, the ratio between the intensity of reflected light of wavelengths shorter than $540m\mu$ and the intensity of reflected light of wavelengths longer than $540m\mu$ differs from the similar ratio for the normal color-free metal strip. The greater the depth of the temper color is, the greater is the degree of absorption of the energy of light having wavelengths shorter than $540m\mu$, and a greater variation in the intensity ratio results. In this manner, the relative extent of the temper color can be measured by detecting the intensity ratio between light of wavelengths shorter than $540m\mu$ and light of wavelengths longer than $540m\mu$ reflected from the metal strip.

FIG. 2 shows an apparatus used for carrying out the method according to the present invention which utilizes the variation in the intensity ratio shown in FIG. 1 for automatically and continuously detecting the relative depth of the temper color. A light shielding casing 18 is provided for shielding various optical elements therein against external light, and a dustproof glass window 19 is fitted in an opening formed in the lower end of the casing 18. This window 19 is desirably made of quartz glass in order to avoid undesirable absorption of light of short wavelengths. A light source 1 which may be a mercury lamp emits a beam of light including a first component having a short wavelength in the order of 400m$\mu$ and a second component having a long wavelength in the order of 600m$\mu$. A pair of convex lenses 2 of quartz and a slit 3 act to condense the light beam emitted from the light source 1 and the condensed light beam is directed toward a stationary or moving metal strip 10 through a pair of filters 6 and 7 carried by a rotary disc 5. The filter 6 permits transmission of the light component of short wavelength only and the filter 7 permits transmission of the light component of long wavelength only. The rotary disc 5 is continuously rotated at a suitable speed by a motor 4. Thus, the light component of short wavelength and the light component of long wavelength in the light beam emitted from the light source 1 are alternately directed toward the metal strip 10 through the respective filters 6 and 7. Such an incident light beam 8 is reflected by the surface of the metal strip 10, and a reflected light beam 9 enters a photo-multiplier 11 having a suitable spectroscopic sensitivity for the light component of short wavelength and light component of long wavelength. When the metal strip 10 to be examined bears a temper color, the light component of short wavelength is absorbed in a greater quantity than in the case of a normal color-free metal strip depending on the depth of the temper color. Thus, the intensity of the reflected light is reduced correspondingly and this reflected light having reduced intensity is sensed by the photo-multiplier 11. The energy of the reflected light is converted into an electrical signal by the photo-multiplier 11 and an output signal as shown in FIG. 3a appears from the photo-multiplier 11. This signal is applied to a signal separator 12 which operates in synchronism with a synchronizing signal responsive to the rotation of the motor 4, for separating the signal into an output signal corresponding to the light component of long wavelength as shown in FIG. 3b and an output signal corresponding to the light component of short wavelength as shown in FIG. 3c. These output signals are then applied to respective integrators 13 and 14 and are integrated thereby to provide voltages corresponding to the intensity of the light component of short wavelength and intensity of the light component of long wavelength. These two voltages are then applied to an arithmetic operating means 15 which determines the ratio therebetween and delivers an electrical signal indicative of the relative depth of the temper color.

The electrical signal indicative of the relative depth of the temper color detected in the above manner may be applied to a recorder 17 so as to be continuously recorded thereon or may be applied to a discriminator 16 to be compared with a critical value of a normal strip so that a control signal or visible or audible alarm signal can be delivered when the relative depth of the temper color exceeds said critical value.

By virtue of the above arrangement, inspectors for visually inspecting the temper color are unnecessary and the occurence of the temper color can be detected in its initial stage by merely paying attention to the instruments and alarm means. Thus, the ability to detect the temper color can be improved and the metal strip production line can be automatically controlled depending on the detected value of the temper color thereby increasing the production rate.

Due to the fact that the temper color is detected according to the present invention on the basis of comparison between the intensity of a light component having one wavelength and the intensity of a light component having another wavelength, the detection of the temper color can be stably and reliably carried out without being adversely affected by variation of common factors such as vertical vibrations of metal strips, variations in the quantity of reflected light due to the difference in the surface finish of metal strips and variations in the electrical properties of the light sensor. Thus, the method of the present invention is especially suitable for measurement at the site of production.

It will be understood from the foregoing description that the temper color detecting method according to the present invention make possible to quickly, automatically, continuously and quantitatively detect a temper color appearing on a stationary or moving metal strip and contribute greatly to improvements in the reliability of inspection and to the saving of labor.

I claim:

1. A method for detecting the existence of a temper color on a stationary or moving metal strip comprising the steps of:
    directing a beam of light, which beam of light includes
    a first light wave component having a first wavelength shorter than a specific wavelength of a characteristic absorption value of light on the surface of said metal strip, at which shorter wavelength the intensity of said first light wave component reflected from said temper color on said metal strip is less than the intensity of said first light wave component reflected from said metal strip free from said temper color, and
    a second light wave component longer than said specified wavelength, at which longer wavelength the intensity of said second light wave component reflected from said temper color on said metal strip is the same as the intensity of said second light wave component reflected from said metal strip free from said temper color, onto the surface of said metal strip, so that said first and second light beam components impinge upon the same surface of said strip along the same optical path;
    detecting the amount of light reflected from said metal strip in said first and second light wave components at the same detection location; and
    comparing the respective detected light quantities in said first and second light wave components with each other.

2. A method as claimed in claim 1, wherein said specific wavelength is 540m$\mu$ (5,400A).

* * * * *